US011332368B1

(12) United States Patent
Huang et al.

(10) Patent No.: US 11,332,368 B1
(45) Date of Patent: May 17, 2022

(54) METHODS FOR HIGH-YIELD SYNTHESIS OF HIGHER GERMANES AND HIGHER SILANES

(71) Applicant: Ge Solartech, LLC, Troy, MI (US)

(72) Inventors: Baoquan Huang, Troy, MI (US); Henry Lee, West Bloomfield, MI (US)

(73) Assignee: Ge Solartech, LLC, Troy, MI (US)

( * ) Notice: Subject to any disclaimer, the term of this patent is extended or adjusted under 35 U.S.C. 154(b) by 303 days.

(21) Appl. No.: 16/729,345

(22) Filed: Dec. 28, 2019

(51) Int. Cl.
*C01B 6/06* (2006.01)
*C01B 33/04* (2006.01)

(52) U.S. Cl.
CPC ............... *C01B 6/06* (2013.01); *C01B 33/04* (2013.01)

(58) Field of Classification Search
CPC .................................. C01B 6/06; C01B 33/04
See application file for complete search history.

(56) References Cited

U.S. PATENT DOCUMENTS

| 4,668,502 A * | 5/1987 | Russotti | C01B 6/06 |
| | | | 423/645 |
| 2012/0114517 A1* | 5/2012 | Itoh | C22C 1/0491 |
| | | | 419/33 |

FOREIGN PATENT DOCUMENTS

FR  2989074 A1 * 10/2013 ........... C01B 33/043

OTHER PUBLICATIONS

Grace, "Liquid Phase Separation and Glass formation of Pd—Si alloy" The Chinese University of Hong Kong, 1997, p. 1-61 (Year: 1998).*
Smichowski et al. : Comparative study to evaluate the effect of different acids on the determination of germanium by hydride generation-inductively coupled plasma atomic emission spectrometry, Analytics Chimica Acta 376 (1998) 283-291 (Year: 1998).*
Timms et al. "The Silicon-Germanium Hydrides" Journal of Chemical Society, 1694, Issue 0 p. 1467-1475 (Year: 1964).*

* cited by examiner

*Primary Examiner* — Anthony J Zimmer
*Assistant Examiner* — Syed T Iqbal
(74) *Attorney, Agent, or Firm* — Kevin L. Bray

(57) ABSTRACT

High-yield synthesis of higher germanes and higher silanes includes the hydrolysis of a germanium- or silicon-containing alloy with chemical formula $A_xB_y$Ge(Si), wherein A=Mg, Ca, Sr, Ba, Li, Na, K, Rb, Cs, and rare earth metals; B=Al, Si, Sn, Ga, Zn, Fe, Co, Ni, Cu, Ag; x=0-10, y=0-10. The hydrolysis reaction is promoted by an acidic substance such as boron oxide ($B_2O_3$), citric acid, hydrochloric acid (HCl), or sulfuric acid ($H_2SO_4$). The present invention provides an efficient method of drying higher germanes and higher silanes to prevent their further hydrolysis. Another synthetic process involves the reaction of germanium oxide, borohydride and boron oxide with water. Still another process comprises hydrolyzing the $Si_{1-x}Ge_x$ alloy with a very dilute base solution. The methods enable production of higher germanes from a wide range of germanium-starting materials, including germanium byproducts, impure germanium compounds, and waste products generated in the plasma deposition of thin films containing germanium.

29 Claims, 10 Drawing Sheets

METHODS FOR HIGH-YIELD SYNTHESIS OF HIGHER GERMANES AND HIGHER SILANES

FIELD OF THE INVENTION

The present disclosure relates to methods for high-yield synthesis of higher germanes, such as digermane ($Ge_2H_6$) and trigermane ($Ge_3H_8$), and higher silanes, such as disilane ($Si_2H_6$) and trisilane ($Si_3H_8$) with high efficiency and low manufacturing cost.

BACKGROUND OF THE INVENTION

Germanes are widely used in the chemical vapor deposition (CVD) of materials containing germanium and devices for the fabrication of semiconductor chips in group IV microelectronic and optoeletronic technologies. For example, heteroepitaxial $Ge_{1-x}Si_x$ layers on Si(100) are used in many applications in key technologies such as MEMS, quantum cascade lasers and Si-based photonics, including high speed modulators and photodetectors. Other uses of germanes include thin film amorphous silicon solar cells.

Because of the constant expansion of the devices and the demands for improved electrical performance of the device structure, silicon integrated device technology is becoming increasingly complex. Disilane ($Si_2H_6$) plays a key role in solving many of the material problems that arise in silicon microelectronics fabrication. The use of disilane is an innovative method to reduce the deposition temperature and increase the deposition rate in the processing of silicon wafers. Today, while the global demand for disilane is substantial, the price remains high because of the high production cost.

Digermane ($Ge_2H_6$) is used in the ultra-high vacuum chemical vapor deposition of amorphous and epitaxial germanium thin films. Digermane is also used in the formation of boron-doped SiGe alloy layers and with diborane in the formation of B-doped Ge(001) films by molecular-beam epitaxy (MBE). Trigermane ($Ge_3H_8$) is used in the ultra-high vacuum chemical vapor deposition of amorphous and epitaxial germanium thin films. The use of trigermane decreases the deposition temperature and increases the deposition rate of germanium.

Benefiting from the rapid growth in the semiconductor industry and thin film technology overall, the market for germanes is experiencing above average growth as well. Global demand for germanes was valued at over US$500 million in 2018 and will witness robust growth in the next few years.

Known methods for the production of germane ($GeH_4$) include reacting a mixture of germanium dioxide and sodium borohydride with sulfuric acid in solution (such as the process described in U.S. Pat. No. 4,668,502 by Russotti, entitled "Method of Synthesis of Gaseous Germane"). Another process for manufacturing germane is electrolysis of a germanium dioxide containing aqueous-alkaline solution (such as that described in "Method for Preparing High-Purity Germanium Hydride" by Vorotyntsev and published as International Publication Number WO2010057073). A highly efficient and low manufacturing cost method for the production of high purity germane has been filed by Huang and Lee, entitled "Method to Produce High Purity Germane from Germanium Dioxide or Impure Germanium Compounds".

Commercial digermane and trigermane come as byproducts isolated from germane; commercial disilane is produced mainly from the decomposition of silane. For example, methods for the production of higher silanes include pyrolysis or thermal deposition, such as U.S. Pat. No. 9,034,292 by Lee, U.S. Pat. No. 9,567,228 by Matsushita, U.S. Pat. No. 8,163,261 by Hazeltine, U.S. Pat. No. 6,027,705 by Kitsumo, U.S. Pat. No. 4,568,437 by Dickson, and WO2011122959 by Bjornstad; electric or plasma discharge, such as U.S. Pat. No. 5,505,913 by Bernard and WO2014200222 by Likubo, electrochemical reaction in U.S. Pat. No. 5,540,830 by Nishida, as well as photochemical process in U.S. Pat. No. 4,604,274 by Zavelovich. Another prior art method of synthesizing disilane and higher silanes is the reaction of a silicon alloy with an acid in an ammonia solvent described in U.S. Pat. No. 4,808,392 by Itoh. These methods have complex processes and high production costs. While numerous methods have been published or patented for synthesizing digermane, trigermane, disilane and trisilane, the synthetic chemical methods described herein are more efficient and less expensive.

SUMMARY

This disclosure provides a high-yield synthetic process for producing higher germanes—such as digermane and trigermane, and higher silanes—such as disilane and trisilane, from the hydrolysis of a germanium-, silicon-containing alloy with chemical formula $A_xB_yGe(Si)$, where A=Mg, Ca, Sr, Ba, Li, Na, K, Rb, Cs, and rare earth metals; B=Al, Si, Sn, Ga, Zn, Fe, Co, Ni, Cu, and Ag; x=0-10; and y=0-10. The hydrolysis reaction is promoted by acidic materials, such as boron oxide ($B_2O_3$), citric acid, hydrochloric acid (HCl) or sulfuric acid ($H_2SO_4$), etc. Preferably, the process involves the hydrolysis of a magnesium aluminum germanium alloy, or a silicon-containing alloy with boron oxide. A second synthesis process involves the reaction of germanium oxide, boron oxide, and a borohydride with water; sodium borohydride is the preferred borohydride. A third process comprises the hydrolysis of a $Si_{1-x}Ge_x$ alloy with a very dilute base solution. A fourth process uses a starting material consisting of a germanium-containing aqueous alkaline solution with an alkaline stabilized borohydride solution. A mixture is formed by adding an acid or acid solution to the starting material to promote hydrolysis of the borohydride. The pH of the mixture dictates the distribution of products formed from the mixture. Products include germane, digermane and trigermane Acidic conditions facilitate the formation of digermane and trigermane, while basic conditions promote the formation of germane.

The methods described herein provide a high-yield process for producing germane, digermane, or trigermane from a germanium-containing starting material and a high-yield process for producing silane, disilane, or trisilane from a silicon-containing starting material. Germanium-containing starting materials include germanium-silicon alloys, alloys of germanium with one or more metals, alloys of germanium with silicon and one or more metals, oxides of germanium, elemental germanium, and germanium-containing solids (including solids produced as waste byproducts in reactions of germanium or germanium compounds). In one embodiment, the germanium-containing starting material is an alloy that includes germanium and magnesium. In another embodiment, the germanium-containing starting material is an alloy that includes germanium and aluminum. In still another embodiment, the germanium-containing starting material is an alloy that includes germanium, magnesium, and aluminum. Silicon-containing starting materials include alloys of silicon with one or more metals and elemental silicon. In one embodiment, the silicon-containing starting material is an alloy that includes silicon and magnesium. In another embodiment, the silicon-containing starting material is an alloy that includes silicon and aluminum. In still another embodiment, the silicon-containing starting material is an alloy that includes silicon, magnesium, and aluminum.

In one embodiment, the germanium-containing starting material is hydrolyzed in the presence of an acid to form a germanium hydride. Germanium hydrides include germane, digermane, trigermane, and combinations of two or more thereof. In another embodiment, the silicon-containing starting material is hydrolyzed in the presence of an acid to form a silicon hydride. Silicon hydrides include silane, disilane, trisilane, and combinations of two or more thereof. Acid includes solid acids and acid solutions. Preferred acids include boron oxide ($B_2O_3$), organic acids (e.g. citric acid ($C_6H_8O_7$) or acetic acid), hydrochloric acid (HCl), phosphoric acid ($H_3PO_4$), and sulphuric acid ($H_2SO_4$). In another embodiment, the hydrolysis reaction of the germanium-containing starting material or the silicon-containing starting material occurs in the presence of an acid in a solution kept acidic (pH<7.0) throughout the reaction to obtain a germanium hydride or silicon hydride in high yield.

In embodiments, the method includes forming a germanium-containing starting material or a silicon-containing starting material. In one embodiment, a germanium-containing starting material is formed by reacting elemental germanium with one or more elemental metals to form an alloy. In another embodiment, a germanium-containing starting material is formed by reacting an alloy of germanium and silicon with one or more metals to form an alloy. In one embodiment, a silicon-containing starting material is formed by reacting elemental silicon with one or more metals to form an alloy. Metals include alkali metals, alkaline earth metals, rare earth metals, and transition metals. Preferred metals include Al and Mg. Reactions include heating and sintering.

In other embodiments, a germanium hydride is formed from a reaction of an oxide of germanium with a borohydride in the presence of an acid. Oxides of germanium include germanium oxide ($GeO_2$) in pure or impure form and oxides that include germanium and one or more other elements. Preferred acids include boron oxide ($B_2O_3$), organic acids (e.g. citric acid ($C_6H_8O_7$) or acetic acid), hydrochloric acid (HCl), phosphoric acid ($H_3PO_4$), and sulphuric acid ($H_2SO_4$). Hydrolysis is a preferred reaction.

The instant process provides an efficient route for synthesizing digermane and trigermane from impure germanium-containing starting materials in which the impure starting material includes germanium in combination with one or more other elements in a solid. In one embodiment, the germanium-containing solid includes germanium and silicon. In another embodiment, the germanium-containing solid includes germanium and a metal.

In an embodiment of the instant process, the germanium-containing starting material is a byproduct formed in a gas phase or plasma reaction of germane or other germanium-containing gas. In one embodiment, a gas phase germanium precursor is reacted, alone or in combination with other precursors, to form a thin film material and the germanium in the unutilized fraction of the germanium precursor forms a solid from which germane gas can be recovered through the methods described herein.

In another embodiment, the germanium-containing starting material is a germanium-silicon solid that reacts with a dilute hydroxide solution at elevated temperatures to form germane, digermane and/or trigermane.

In other embodiments, the present disclosure also provides a process for producing digermane and trigermane from germanium oxide. The process includes mixing germanium oxide with sodium borohydride and boron oxide, and converting the germanium-containing mixture to digermane and trigermane by hydrolysis.

DETAILED DESCRIPTION OF THE ILLUSTRATED EMBODIMENTS

Figure 1:
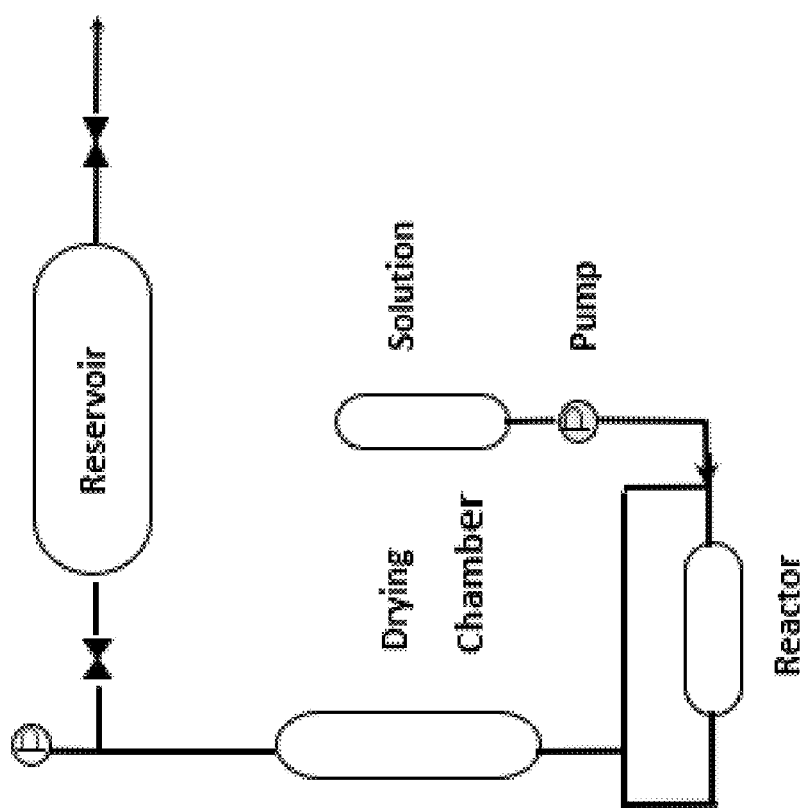
FIG. 1 is a synthesis system comprising a reactor, a solution container, a drying chamber, a reservoir, a pressure transducer and a pump.

Although this disclosure describes certain preferred embodiments in detail, other embodiments that are apparent to those of ordinary skill in the art, including embodiments that do not provide all the benefits and features set forth herein, are also within the scope of this disclosure. Accordingly, the scope of the disclosure is defined only by reference to the appended claims.

In this specification and in the claims which follow, reference will be made to a number of terms which shall be defined to have the following meanings:

"Germane" means $GeH_4$, "digermane" means $Ge_2H_6$, "trigermane" means $Ge_3H_8$, "disilane" means $Si_2H_6$, and "trisilane" means $Si_3H_8$.

"Germanium hydride" or "hydride of germanium" means germane, digermane, trigermane, or combinations of two or more thereof.

"Silicon hydride" or "hydride of silicon" means silane, disilane, trisilane, or combinations of two or more thereof.

The description herein provides processes for producing higher germanes, such as digermane and trigermane, and higher silanes, such as disilane and trisilane, with high efficiency and at a low manufacturing cost. Commercial digermane and trigermane currently come as byproducts isolated from the production of germane and commercial disilane is produced mainly as a byproduct from the decomposition of silane. For example, methods for the production of higher silanes include pyrolysis or thermal deposition, such as U.S. Pat. No. 9,034,292 by Lee, U.S. Pat. No. 9,567,228 by Matsushita, U.S. Pat. No. 8,163,261 by Hazeltine, U.S. Pat. No. 6,027,705 by Kitsumo, U.S. Pat. No. 4,568,437 by Dickson, and WO2011122959 by Bjornstad, electric or plasma discharge, such as U.S. Pat. No. 5,505,913 by Bernard and WO2014200222 by Likubo, electrochemical reaction in U.S. Pat. No. 5,540,830 by Nishida, as well as photochemical process in U.S. Pat. No. 4,604,274 by Zavelovich. Another prior art method of synthesizing disilane and higher silanes is the reaction of a silicon alloy with an acid in an ammonia solvent described in U.S. Pat. No. 4,808,392 by Itoh. These methods involve complex processes and high production costs. While numerous methods have been published or patented for synthesizing digermane, trigermane, disilane and trisilane, the methods described herein are highly efficient and inexpensive.

The instant description provides methods to produce germanium hydrides such as digermane and trigermane and silicon hydrides, such as disilane, in high yields. The methods include hydrolysis reactions of a germanium-containing starting material or a silicon-containing starting material in the presence of an acid. Germanium-containing starting materials include germanium-silicon alloys, alloys of germanium with one or more metals, alloys of germanium with silicon and one or more metals, oxides of germanium, elemental germanium, and germanium-containing solids (including solids produced as waste byproducts in reactions of germanium or germanium compounds). In one embodiment, the germanium-containing starting material is an alloy that includes germanium and magnesium. In another embodiment, the germanium-containing starting material is an alloy that includes germanium and aluminum. In still another embodiment, the germanium-containing starting material is an alloy that includes germanium, magnesium, and aluminum. Silicon-containing starting materials include alloys of silicon with one or more metals and elemental silicon. In one embodiment, the silicon-containing starting material is an alloy that includes silicon and magnesium. In another embodiment, the silicon-containing starting material is an alloy that includes silicon and aluminum. In still another embodiment, the silicon-containing starting material is an alloy that includes silicon, magnesium, and aluminum.

Germanium-containing starting materials include alloys with the chemical formula $A_xB_yGe_zSi_q$, where A and B are metals or combinations of metals. Preferred embodiments of the metal A are Mg, Ca, Sr, Ba, Li, Na, K, Rb, Cs, rare earth metals and combinations of two or more thereof. Mg is a particularly preferred embodiment of the metal A. Preferred embodiments of metal B are Al, Si, Sn, Ga, Zn, Fe, Co, Ni, Cu, Ag, other transition metals, and combinations of two or more thereof. Al is a particularly preferred embodiment of metal B. The stoichiometric coefficient x satisfies one or more of the conditions $x \geq 0$, $x \leq 10$, $x \leq 5$, $x \leq 3$, $x \geq 1$, $x \geq 2$, $0 \leq x \leq 10$, $1 \leq x \leq 10$, $1 \leq x \leq 5$, and $2 \leq x \leq 4$. The stoichiometric coefficient y satisfies one or more of the conditions $y \geq 0$, $y \leq 10$, $y \leq 5$, $y \leq 3$, $y \geq 1$, $0 \leq y \leq 10$, $1 \leq y \leq 10$, $1 \leq y \leq 5$, and $1 \leq y \leq 3$. The coefficients z and q satisfy one or more of the conditions $z+q>0$, $z \geq 0$, $q \geq 0$, and $z+q=1$. In one embodiment, $x \geq 0$, $y \geq 0$, $x+y>0$, $z \geq 0$, $q \geq 0$, and $z+q>0$. In one embodiment, $x \geq 0$, $y \geq 0$, $x \leq 10$, $y \leq 10$, $x+y>0$, $z \geq 0$, $q \geq 0$, and $z+q>0$. In one embodiment, $x \geq 0$, $y \geq 0$, $x \leq 10$, $y \leq 10$, $x+y>0$, $z \geq 0$, $q \geq 0$, and $z+q=1$. In one embodiment, $x \geq 0$, $y \geq 0$, $x \leq 5$, $y \leq 5$, $x+y>0$, $z \geq 0$, $q \geq 0$, and $z+q=1$. In one embodiment, $x \geq 1$, $y \geq 0$, $x \leq 5$, $y \leq 5$, $x+y>0$, $z \geq 0$, $q \geq 0$, and $z+q=1$. In one embodiment, $x \geq 0$, $y \geq 0$, $x \leq 5$, $y \leq 3$, $x+y>0$, $z \geq 0$, $q \geq 0$, and $z+q=1$. In one embodiment, $x \geq 1$, $y \geq 0$, $x \leq 5$, $y \leq 3$, $x+y>0$, $z \geq 0$, $q \geq 0$, and $z+q=1$. In one embodiment, x is 2 or 3, $y \geq 0$, $y \leq 3$, $z \geq 0$, $q \geq 0$, and $z+q=1$. In one embodiment, x is 2 or 3, y is 1 or 2, $z \geq 0$, $q \geq 0$, and $z+q=1$. In other embodiments, one of z or q is zero in any of the foregoing embodiments.

Embodiments of the methods disclosed herein include preparation of a germanium-containing or silicon-containing starting material. Alloys having the formula $A_xB_yGe_zSi_q$ are prepared, for example, by mixing A and B in elemental form along with Ge and/or Si in elemental form and heating in an inert environment to sinter. In other embodiments, the germanium-containing starting material or silicon-containing starting material is recovered as a solid waste byproduct formed from an unutilized germanium or silicon precursor in a thin film deposition or microelectronics fabrication process. The solid waste byproduct includes Ge and/or Si in combination with oxygen and/or one or more metals in pure or impure form in a single phase or multiple phase material.

In one embodiment, the germanium-, or silicon-containing starting material is hydrolyzed in the presence of an acid. Acids include solid acidic materials, such as boron oxide ($B_2O_3$) or citric acid ($C_6H_8O_7$), or acid solutions, such as hydrochloric acid (HCl), sulfuric acid ($H_2SO_4$), or phosphoric acid ($H_3PO_4$). Preferred acids include boron oxide ($B_2O_3$) and citric acid ($C_6H_8O_7$). In the reactions disclosed herein, the germanium- or silicon-containing starting material is mixed with the acid and deionized water is gradually added to the mixture, thereby releasing the product gases, including higher germanes or higher silanes. The mixture has a pH less than 7.0, such as a pH in the range from 1.0 to 7.0, or in the range from 2.0 to 6.5, or in the range from 3.0 to 6.0. As used herein, "higher germane" and "higher silane" or "higher order germane" and "higher order silane" refers to a germanium (or silicon) hydride that includes two or more germanium (or silicon) atoms (e.g. digermane, trigermane, disilane, trisilane).

In order to protect metastable digermane, trigermane or disilane from further hydrolysis, the product gas is preferably dried immediately. The product gas is passed over a drying agent to remove water. In one embodiment, boron oxide ($B_2O_3$) is used as a drying argent. Boron oxide is capable of absorbing large amounts of water vapor to form boric acid. The boric acid is a weak acid that can protect digermane, trigermane and disilane from further hydrolysis, thereby increasing the yield of higher order germanes and silanes in the reactions described herein.

In digermane, trigermane and disilane, Ge—Ge (Si—Si) bonds are weak and tend to rupture to form Ge—H, Ge—O or Si—O bonds, thereby forming compounds having these bonds through hydrolysis, especially in the presence of traces of base. Acidic conditions promote the formation of higher-order germanes and silanes. Germane, for example, reacts to form digermane and trigermane through hydrogen abstraction in acidic solution, according to the reactions:

$$GeH_4 + H^+ \rightarrow \cdot GeH_3 + H_2 \qquad (1)$$

$$H_3Ge \cdot + \cdot GeH_3 \rightarrow Ge_2H_6 \qquad (2)$$

$$Ge_2H_6 + H^+ \rightarrow \cdot Ge_2H_5 + H_2 \qquad (3)$$

$$H_3Ge \cdot + \cdot Ge_2H_5 \rightarrow Ge_3H_8 \qquad (4)$$

The hydrolysis reaction of the alloy $A_xB_yGe_zSi_q$ is a process of kinetic control. During the reaction of the alloy with water, the alkali or alkaline earth element (e.g. metal A) first takes the oxygen of the water and reduces the protons to form hydrogen atoms or hydride anions, thereby reacting these hydrogen atoms or the hydride anions with germanium or silicon atom to form germanes or silanes. In addition to germanium and/or silicon hydrides, the product of the hydrolysis reaction may also contain water and if the reaction product is not dried immediately, the germanium and/or silicon hydrides will hydrolyze to form germanium hydroxide or silicon hydroxide and hydrogen. The present invention provides a method of drying the product of the hydrolysis reaction by transferring the reaction product to a drying chamber in order to prevent further hydrolysis of the germanium and/or silicon hydrides in the product of the hydrolysis reaction. The drying chamber includes a drying agent to remove water. Preferred drying agents are acidic. A preferred acidic drying agent is boric acid ($B_2O_3$). Boric acid has a weak acidity and has low reactivity with hydrides of germanium and silicon.

Silane and higher silanes have a high acidity, and Si—H and Si—Si bonds are significantly weaker than Si—O bonds, thereby causing them to be strongly hydrolyzed in the presence of water. This is why it is difficult to synthesize a silane compound in an aqueous solution. Germane, in contrast, has a low acidity and does not particularly react with water even in a weak basic solution. As a result, germane can be synthesized in high yield in an aqueous solution. Higher germanes possess a weaker Ge—Ge bond and have a relatively higher acidity, thus they are more readily hydrolyzed.

In contrast, the basic solution provides an environment to selectively produce pure germane without higher germanes. The synthesis reaction of germane is thermodynamically controlled in the basic environment. To illustrate, the bond energy of Ge—Ge is much lower than the bond energy of Ge—H. Thus, the formation of germane is energetically favored. Conversely, the reactions to form higher order germanes, such as digermane and trigermane, are energetically disfavored.

In one embodiment, the methods disclosed herein produce higher germanes or higher silanes with hydrolysis of the alloy $A_xB_yGe_zSi_q$. A is one or more metals selected from the group consisting of Mg, Ca, Sr, Ba, Li, Na, K, Rb, Cs, and rare earth metals. More preferably, A is one or more of Mg, Ca, Li and Na since they are lightweight and low cost. Most preferably, A includes Mg since the hydrolyzed product of Mg alloy is a weaker base which reacts with boric acid to form a neutral salt, thereby preventing hydrolysis of germanes or silanes. B is one or more elements selected from the group consisting of Al, Si, Sn, Ga, Zn, Fe, Co, Ni, Cu, and Ag. More preferably, B includes one or both of Al and Zn since both elements are of a dual nature, thereby protecting germanes or silanes from hydrolysis. Most preferably, B is Al. x is selected in the range from 0 to 10, and y in the range from 0 to 10. More preferably, x is selected in the range from 1 to 5, and y in the range from 0 to 4. Most preferably, x is selected in the range from 2 to 3 and y in the range from 0 to 2.

In one embodiment, the hydrolysis process synthesizes higher germanes or higher silanes in the presence of an acid. The acid promotes the hydrolysis reaction. The acidic materials selected are inorganic compounds, such as $B_2O_3$, HCl, $H_2SO_4$ and $H_3PO_4$, etc., organic compounds such citric acid, acetic acid and other organic acids. Preferably, a solid acidic material, such as $B_2O_3$ and citric acid, is selected as the acid since hydrolysis of the mixture of the alloy and the solid acidic material facilitates the kinetically controlled process, thereby resulting in a high yield product. Most preferably, the acid is the solid acidic material $B_2O_3$ because it has a weaker acidity.

In another embodiment, a method produces higher germanes by hydrolyzing a mixture of germanium oxide, boron oxide, and a borohydride. This process allows direct contact between solid germanium oxide, boron oxide, and a borohydride, facilitating the formation of kinetically controlled products. During the reaction, boron oxide forms boric acid that protects germanes from hydrolysis, thereby promoting a high yield of germanes Borohydrides include lithium borohydride ($LiBH_4$), sodium borohydride ($NaBH_4$), and potassium borohydride ($KBH_4$).

In another embodiment, a process for synthesizing higher germanes includes a reaction of a $Si_{1-x}Ge_x$ alloy with a very dilute basic solution. In $Si_{1-x}Ge_x$ alloys, silicon is easily hydrolyzed in the alkaline environment to form acidic silicates and hydrogen, while germanium is inert. The formation of silicate anions will reduce the alkalinity of the solution. Therefore, this process does not produce silane since silane is very sensitive to alkali. However, germanes are relatively less sensitive to alkali and therefore can survive in a weakly alkaline environment.

The hydrolysis process is carried out in the synthesis system, as shown in FIG. 1. The system consists of a reactor, a solution container, a drying chamber, and a reservoir. The system is also installed with a pump and a pressure transducer. The reactor is loaded with the mixture of alloy powders (e.g. powder form of $A_xB_yGe_zSi_q$) and solid acidic material powders, such as $B_2O_3$ or citric acid. The solution container is filled with a solution, such as deionized water or a dilute alkaline solution. The drying chamber is loaded with an acidic drying agent, such as $B_2O_3$, $MgCl_2$, $CaCl_2$, $Mg_2SO_4$, zeolites, etc. $B_2O_3$ is a preferred drying agent. During the synthesis, the solution from the solution chamber is supplied to the reactor to hydrolyze the alloy powder, gaseous germanes (germanium hydrides) and/or silanes (silicon hydrides) are formed, and pass through the drying chamber immediately to contact the drying agent, thereby reducing their further hydrolysis as described above. Dry germanes (germanium hydrides) and silanes (silicon hydrides) can be stored in the reservoir for a long period of time.

The methods disclosed herein provide processes for producing higher germanes from a wide variety of solid phase germanium-containing starting materials. The prevailing commercial process for producing germane uses high-purity germanium dioxide ($GeO_2$) as a starting material. High-purity germanium dioxide is prepared commercially from a fly ash or zinc ore processing method. Since these processes are expensive to operate, the germanium dioxide source material for the commercial production of germane is costly and the cost of germane gas is accordingly high. By expanding the range of potential germanium-containing starting materials (including, for example, germanium-containing starting materials with impurities) for germane production, the reactions described herein provide an opportunity to greatly reduce the cost of germane.

The methods disclosed herein permit the formation of germane from virtually any germanium-containing solid, whether pure or impure. The germanium-containing solid may be an oxide or a non-oxide. The germanium-containing solid may include germanium in combination with one or more elements, e.g. silicon, boron, phosphorous, arsenic, transition metal, alkali metal, alkaline earth metal, post-transition metal, or halogen. The germanium-containing solid may be a crystalline, polycrystalline, or amorphous phase material, and may be a single-phase or multiple-phase material.

In one embodiment, the germanium-containing starting material includes a germanium oxide phase (e.g. $GeO_2$) with one or more impurities in the form of a solid solution. In another embodiment, the germanium-containing starting material includes a heterogeneous mixture of a germanium oxide phase (with or without an impurity) and another solid material (which may or may not contain germanium and which may or may not be an oxide).

In one embodiment, less than 90 wt % of the germanium in the germanium-containing solid starting material is in the form of germanium dioxide. In a second embodiment, less than 80 wt % of the germanium in the germanium-containing solid starting material is in the form of germanium dioxide. In a third embodiment, less than 70 wt % of the germanium in the germanium-containing solid starting material is in the form of germanium dioxide. In a fourth embodiment, less than 50 wt % of the germanium in the germanium-containing solid starting material is in the form of germanium dioxide. In a fifth embodiment, the germanium-containing solid starting material includes germanium in the form of germanium dioxide and a non-oxide of germanium.

In one embodiment, the germanium-containing solid is formed as a byproduct of a thin film process that forms a germanium-containing material. The thin film process may be a chemical vapor deposition process (e.g. CVD, PECVD, MOCVD) or a plasma deposition process (e.g. PECVD, sputtering, reactive sputtering) that uses a germanium precursor. In the thin film process, a gas phase germanium precursor is delivered to the deposition reactor and reacted or decomposed to deposit a germanium-containing thin film material on a substrate. In most thin film processes, the utilization of the germanium precursor is low and only a relatively small fraction of the germanium available from the precursor gets incorporated in the deposited thin film material. The balance of the germanium is vented as a gas-phase waste product or becomes incorporated in a solid-phase byproduct. Such solid-phase byproducts are within the scope of starting materials for producing germane gas in the context of the instant disclosure.

In one embodiment, the germanium-containing solid is formed as a byproduct of the reaction of silane ($SiH_4$) and germane ($GeH_4$). In this reaction, silane and germane are gas-phase precursors that react to form a thin film silicon-germanium alloy ($Si_xGe_{1-x}$) on a substrate. The utilization of germane is low and less than half of the germanium supplied with the germane precursor is incorporated in the silicon-germanium alloy. A substantial fraction of the germanium ends up in a solid-phase byproduct that also includes silicon. The byproduct may also contain low levels of oxygen. If the silicon-germanium alloy formed in the process is formed as an intentionally doped n-type or p-type material, the byproduct may also include doping elements such as boron, phosphorous, or arsenic.

In another germanium thin film deposition process, the germanium precursor is an organometallic compound such as an alkyl germanium compound (e.g. $Ge(CH_3)_4$, $Ge(C_2H_5)_4$) or a germanium amine compound (e.g. $Ge(NH_3)_4$). In these processes, the germanium-containing solid byproduct may also include nitrogen, carbon, and/or hydrogen.

In embodiments where the germanium-containing solid is formed as a byproduct of a gas phase reaction or decomposition involving a germanium precursor, embodiments of the method disclosed herein further include recovery of the germanium precursor from the effluent of the process. As indicated hereinabove, only a portion of the germanium precursor used in most thin-film deposition processes is utilized, and significant amounts of unutilized germanium exit the process in an effluent stream. The effluent stream may include unreacted germanium precursors, gas-phase byproducts formed in the process, diluent gases, and/or air. The gas-phase byproducts include germanium-containing gases other than germane and/or gases that do not contain germanium. The effluent gas may be captured and fractionated to recover unreacted gas-phase germanium precursors or germanium-containing byproduct gases. Recovery of germanium from both the effluent and solid-phase byproducts improves the overall efficiency and economics of the process.

In some embodiments, the germanium-containing starting material is first mixed with magnesium or aluminum powders and sintered to form an alloy product that is subsequently converted to digermane and trigermane. The alloy product is used as a starting material in embodiments of the reaction described herein. For example, the alloy product can be hydrolyzed with an acid solution. In one embodiment, the process includes contacting the germanium-containing alloy powders with an acid solution. The acid solution include an inorganic acid, such as sulfuric acid ($H_2SO_4$), hydrochloric acid (HCl), boric acid ($H_3BO_3$), etc. or an organic carboxylic acid, such as citric acid, acetic acid, etc. In another embodiment, the process comprises mixing the germanium-containing alloy powders with solid acid powders, such as boric acid and citric acid, and then reacting with water. Hydrochloric acid (HCl) can be used to convert germanium in the germanium-containing solid to germanium chloride ($GeCl_4$), which can then be hydrolyzed to an oxide form of germanium (e.g. $GeO_2$) and reacted to form germane as described herein. The oxidation product includes germanium in an oxidized state and the oxidation step converts non-oxidic germanium-containing starting materials (or non-oxidic germanium-containing impurity phases in germanium oxide solids) into an oxide form of germanium.

In these embodiments, germane is produced from the oxidation product of the germanium-containing starting material. The production of germane from the oxidation product of the germanium-containing starting material may occur through an electrochemical reduction process (such as that described in "Method for Preparing High-Purity Germanium Hydride" by Vorotyntsev and published as International Publication Number WO 2005/005673, the disclosure of which is incorporated by reference herein) or through a chemical reaction of the oxidation product of the germanium-containing starting material with a reducing agent (such as the process described in U.S. Pat. No. 4,668,502 by Russotti, entitled "Method of Synthesis of Gaseous Germane", the disclosure of which is incorporated by reference herein).

In a typical electrochemical process, germane is prepared from a solution or slurry of the oxidation product of the germanium-containing starting material. The electrolysis may be performed in an aqueous alkaline solution or slurry of the oxidation product of the germanium-containing starting material. The electrochemical process may be performed in an electrochemical diaphragm cell using, for example, a nickel cathode.

In a typical chemical reduction process, the oxidation product of the germanium-containing solid is dissolved or suspended in an aqueous hydroxide base and reacted with a metal borohydride or metal aluminum hydride (e.g. $NaBH_4$, $LiBH_4$, $LiAlH_4$). The product of this reaction is acidified with a strong acid to form a gaseous product, which is then purified to form germane gas.

The invention will be illustrated in more detail with reference to the following examples.

Example 1

Alloy preparation: 100 g of Mg powder, 50 g of Al powder and 60 g of Ge powder were thoroughly mixed, and sintered at 800° C. for 1 hr. The alloy was ground into powders, mixed with 200 g of $B_2O_3$, and then loaded into stainless steel vessel that was connected to the reaction system as showed in FIG. 1.

Hydrolysis: 2000 ml of deionized water was gradually added into the reactor, the product gases were released, passed through a drying chamber containing boron oxide ($B_2O_3$), and then stored in the reservoir.

Figure 2:
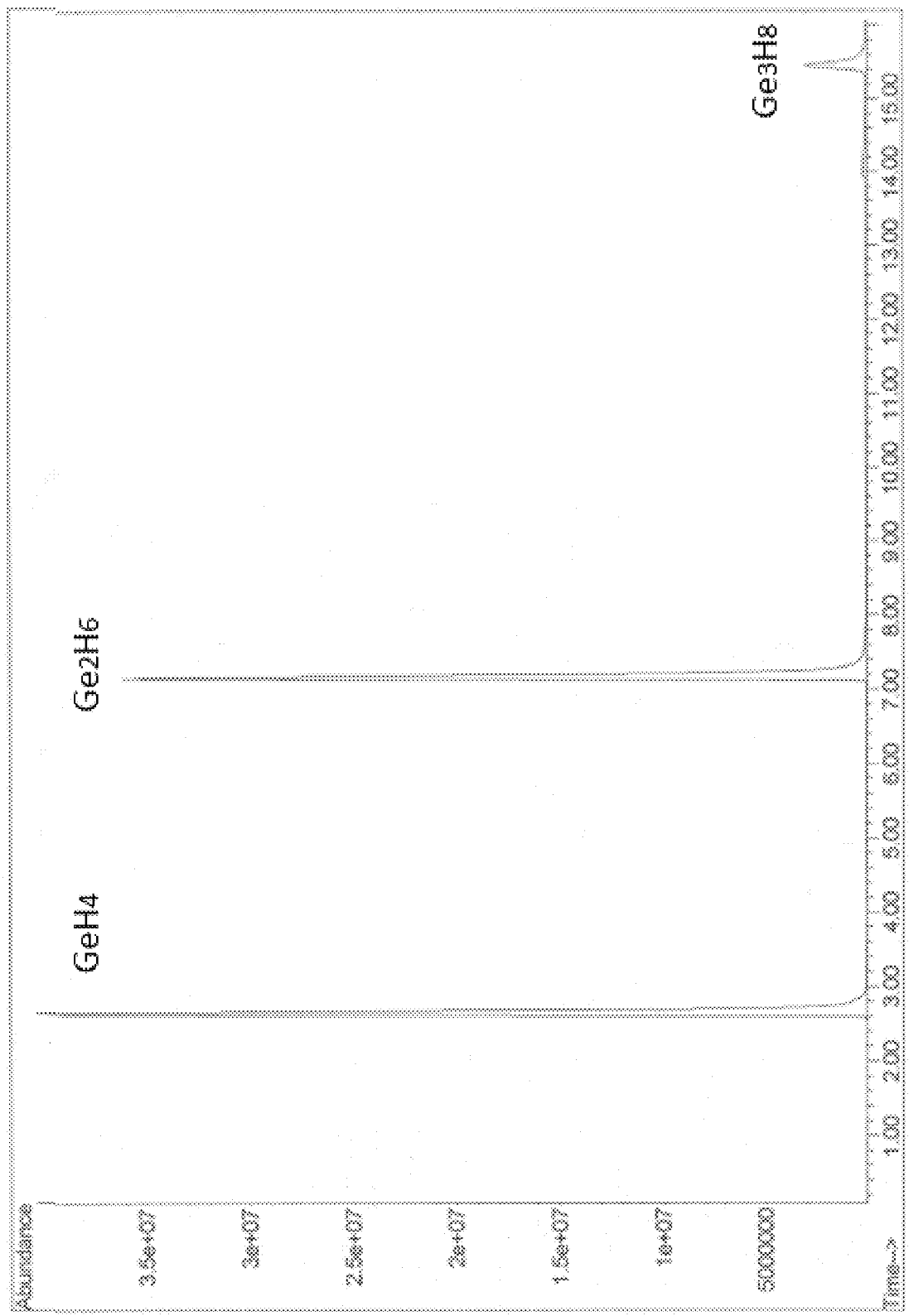
FIG. 2 is a gas chromatogram (GC) from Example 1, indicating the presence of germane ($GeH_4$) (at 2.7 minute), digermane ($Ge_2H_6$) (at 7.2 minute) and trigermane ($Ge_3H_8$) (at 15.5 minute).
Figure 3:
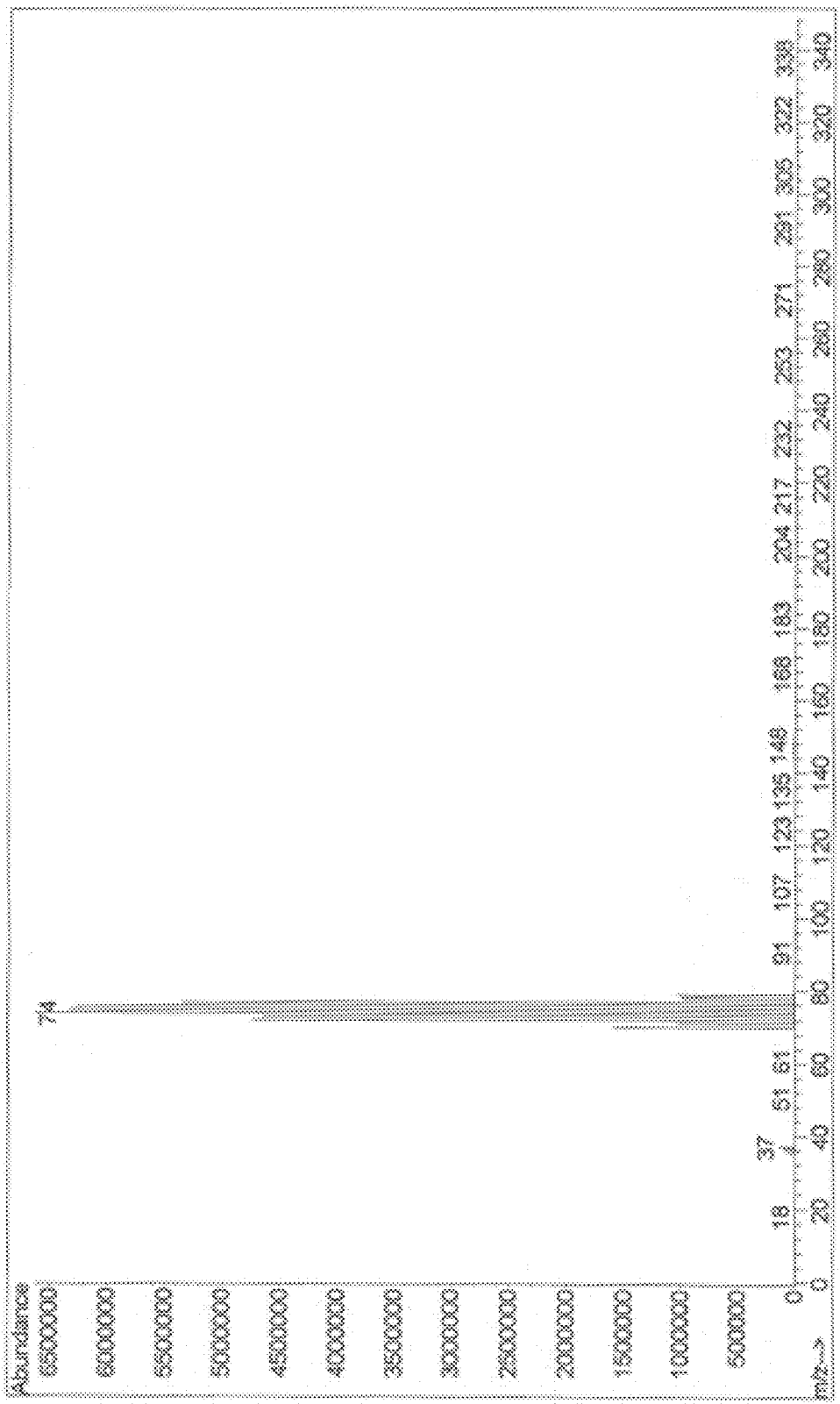
FIG. 3 is a mass spectrum (MS) of germane ($GeH_4$).
Figure 4:
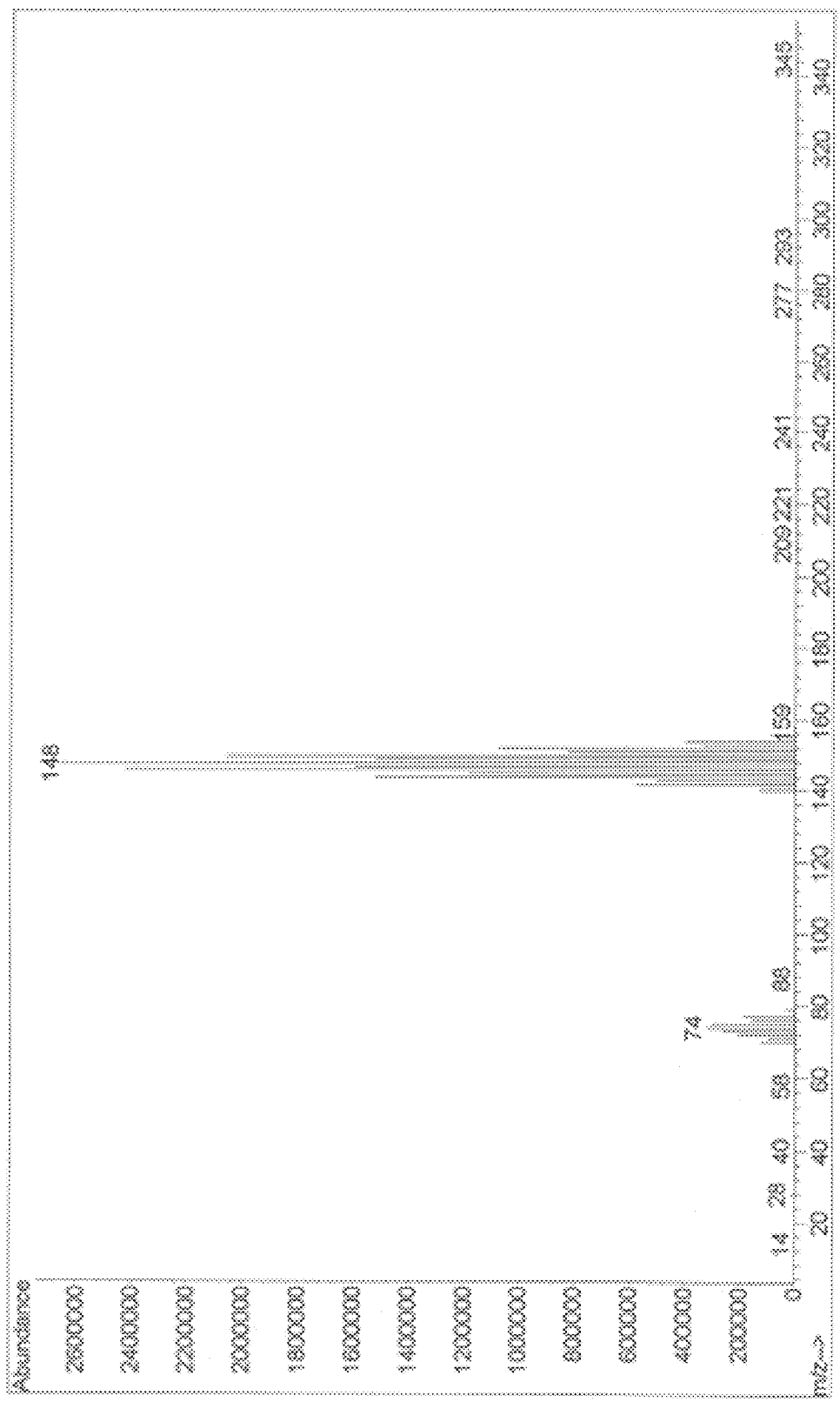
FIG. 4 is a mass spectrum (MS) of digermane ($Ge_2H_6$).
Figure 5:
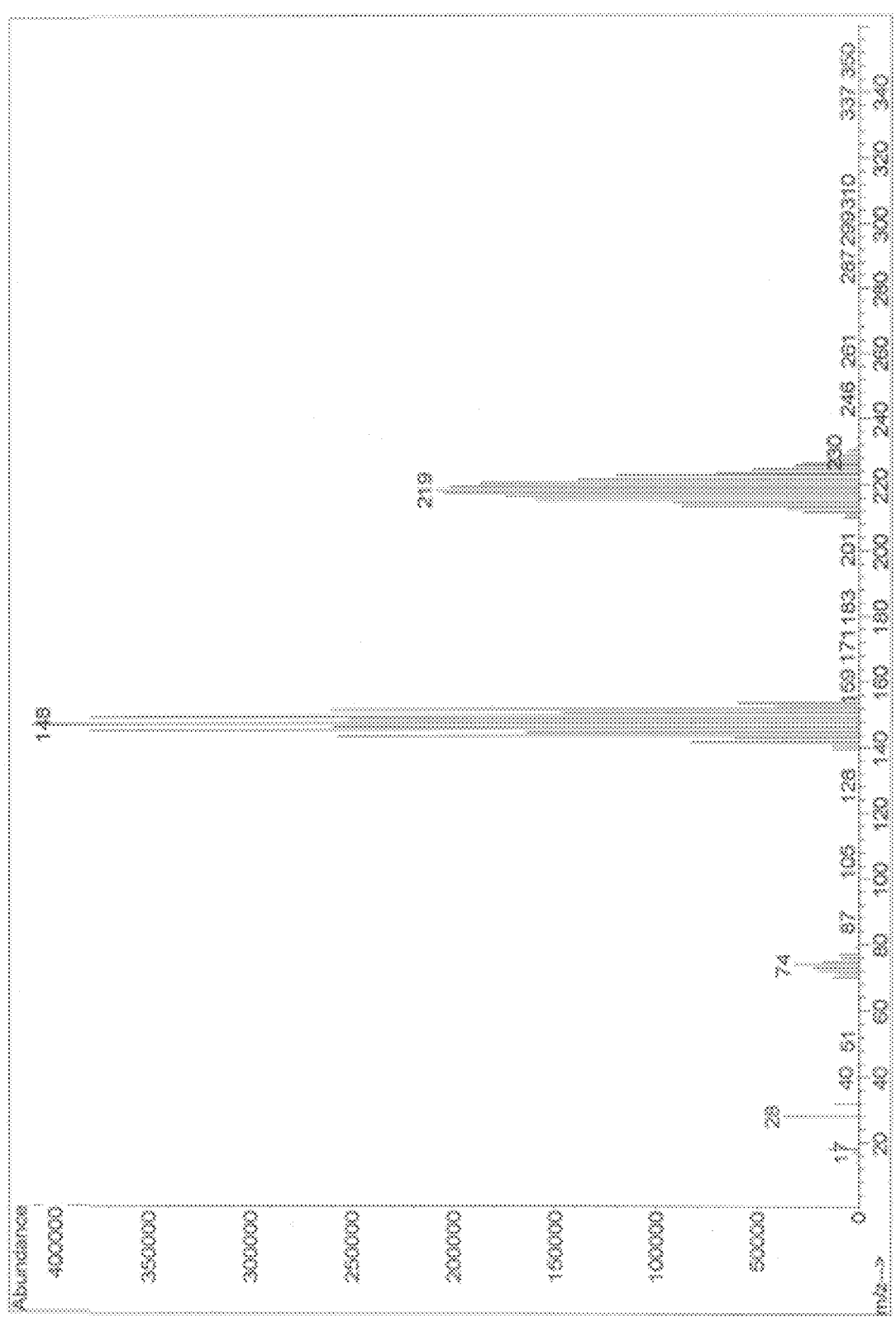
FIG. 5 is a mass spectrum (MS) of trigermane ($Ge_3H_8$).

GC/MS analysis: Samples were collected from the reservoir and tested in GC/MS in an Agilent Technologies 6890N/5973 GC system with 5973 Mass Spectrometer. The temperature programming of the GC was maintained at 75° C. for the first three minutes, increased 5° C./min to 135° C., and then held at that temperature to the end of the experiment. FIG. 2 shows the results of a gas chromatogram (a plot of relative abundance as a function of retention time in minutes) indicating the presence of germane ($GeH_4$) (at 2.7 minute), digermane ($Ge_2H_6$) (at 7.2 minute) and trigermane ($Ge_3H_8$) (at 15.5 minute). The mass spectrum (a plot of relative abundance as a function of m/z (mass/charge) ratio) results show germane in FIG. 3, digermane in FIG. 4 and trigermane in FIG. 5.

Example 2

Synthesis: 40 g of germanium oxide ($GeO_2$), 60 g of boron oxide ($B_2O_3$) and 100 g of sodium borohydride ($NaBH_4$) were mixed and then loaded in the reactor (stainless steel vessel). As shown in FIG. 1, the reactor was installed in the synthesis system. As 2000 ml of deionized water was gradually added to the reactor, product gases $GeH_4$, $Ge_2H_6$, $Ge_3H_8$, etc. as well as hydrogen were generated, passed through a drying chamber containing boron oxide ($B_2O_3$), and then stored in the reservoir.

Figure 6:
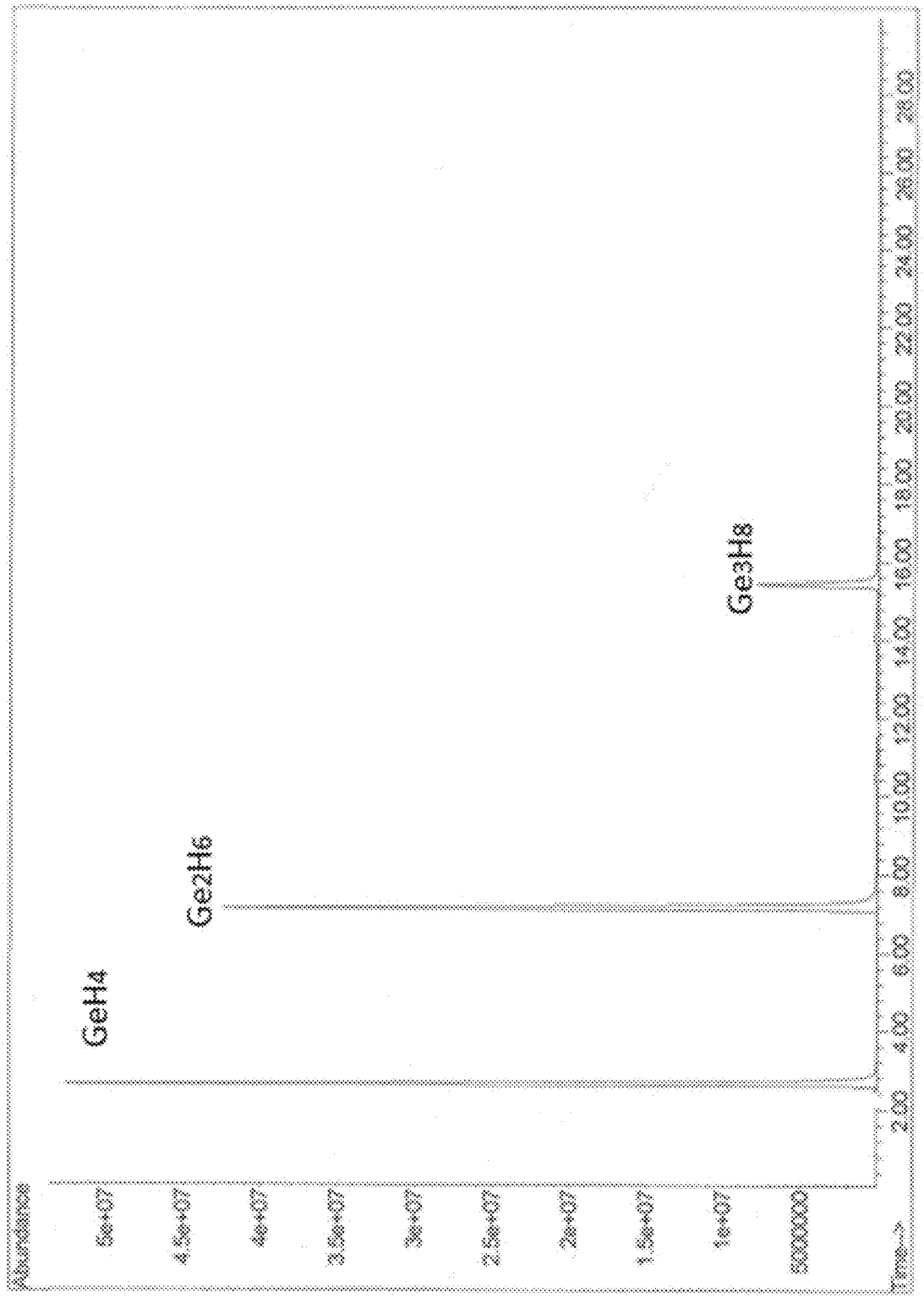
FIG. 6 is a gas chromatogram (GC) from Example 2, indicating the presence of germane ($GeH_4$) (at 2.7 minute), digermane ($Ge_2H_6$) (at 7.2 minute) and trigermane ($Ge_3H_8$) (at 15.5 minute).

GC/MS analysis: Samples were collected from the reservoir and tested in an Agilent Technologies 6890N/5973 GCMS system. The temperature programming of the GC was maintained at 75° C. for the first three minutes, increased 5° C./min to 135° C., and then held at that temperature to the end of the experiment. FIG. 6 shows the results of a gas chromatogram (a plot of relative abundance as a function of retention time in minutes) indicating the presence of germane ($GeH_4$) (at 2.7 minute), digermane ($Ge_2H_6$) (at 7.2 minute) and trigermane ($Ge_3H_8$) (at 15.5 minute). The mass spectrum (a plot of relative abundance as a function of m/z (mass/charge) ratio) results show germane (analogous to the plot shown in FIG. 3), digermane (analogous to the plot shown in FIG. 4) and trigermane (analogous to the plot shown in FIG. 5).

Example 3

Alloy preparation: 110 g of Mg powders, 50 g of Al and 80 g of Si powder were thoroughly mixed, and sintered at 780° C. for 1 hr. The alloy was ground into powders, mixed with 200 g of $B_2O_3$, and then loaded into the reactor (stainless steel vessel) that was installed in the synthesis system as shown in FIG. 1.

Hydrolysis: As 2000 ml of deionized water was gradually added into the reactor, the product gases were released, passed through a dry chamber containing boron oxide ($B_2O_3$), and then stored in the reservoir.

Figure 7:
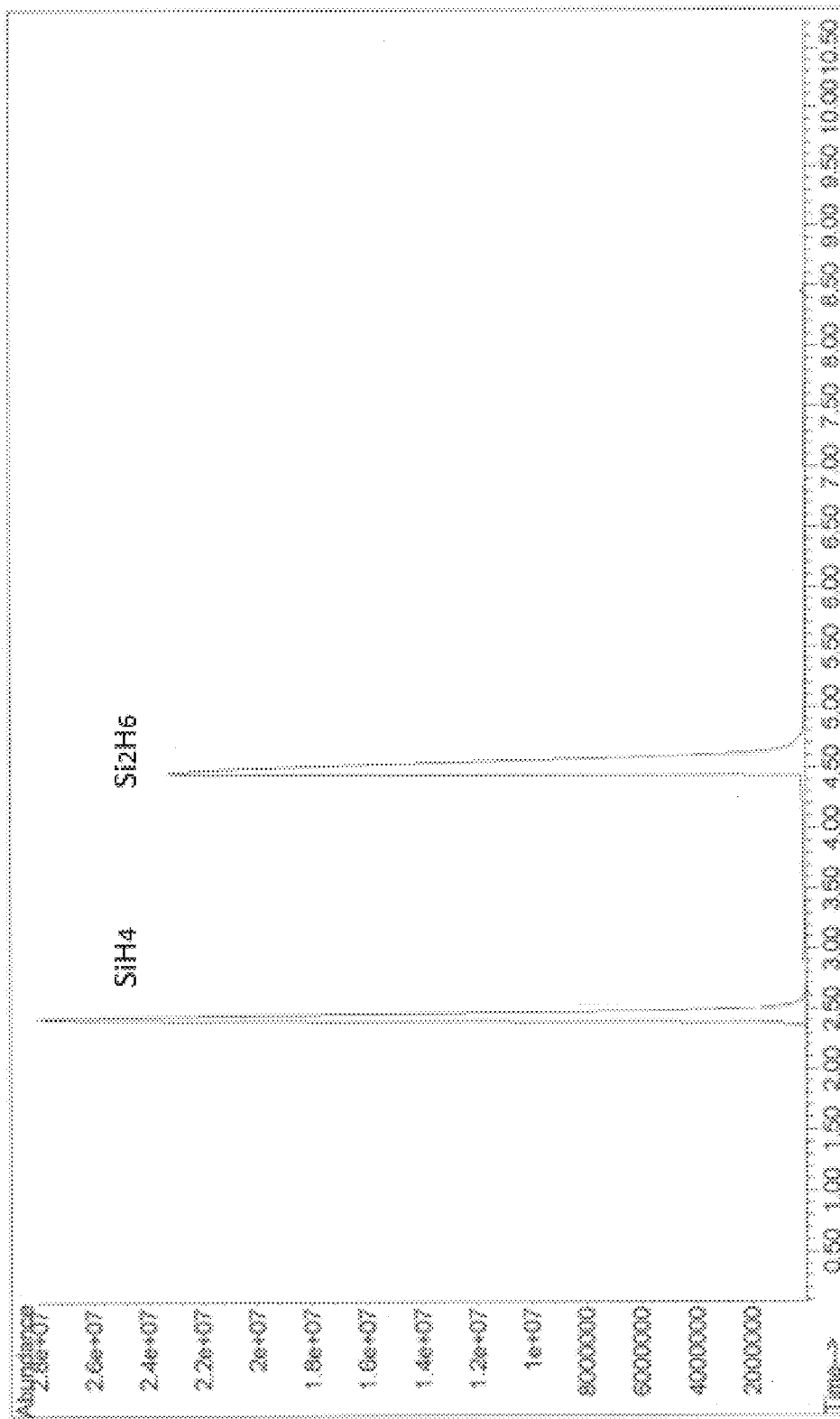
FIG. 7 is a gas chromatogram (GC) from Example 3, indicating the presence of silane ($SiH_4$) (at 2.45 minute) and disilane ($Si_2H_6$) (at 4.5 minute).
Figure 8:
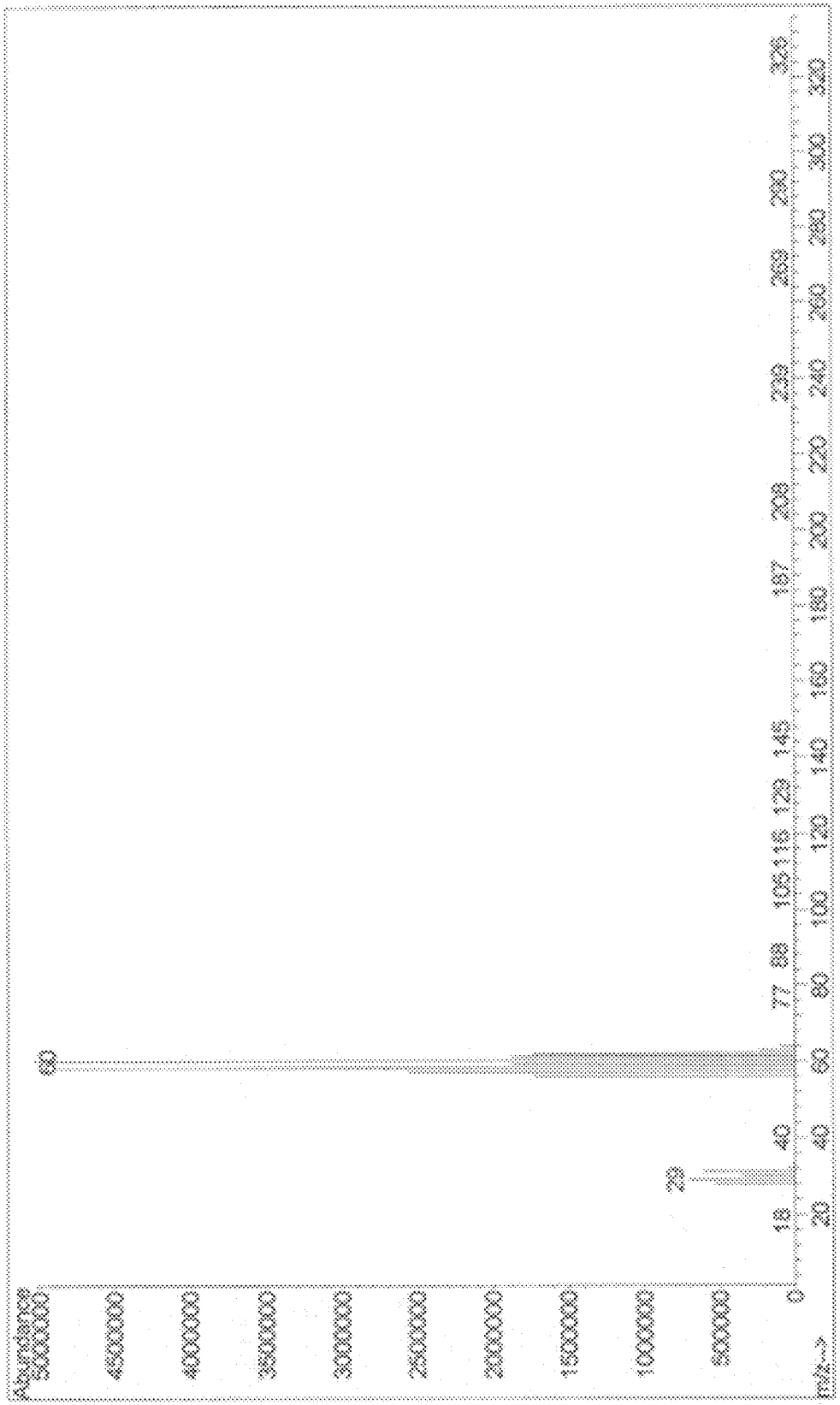
FIG. 8 is a mass spectrum (MS) of disilane ($Si_2H_6$).

GC/MS analysis: Samples were collected from the reservoir and analyzed in an Agilent Technologies 6890N/5973 GCMS system. The temperature programming of the GC was maintained at 75° C. for the first three minutes, increased 5° C./min to 135° C., and then held at that temperature to the end of the experiment. FIG. 7 shows the results of a gas chromatogram (a plot of relative abundance as a function of retention time in minutes) indicating the presence of silane ($SiH_4$) (at 2.45 minute) and disilane ($Si_2H_6$) (at 4.5 minute). FIG. 8 shows the mass spectrum (a plot of relative abundance as a function of m/z (mass/charge) ratio) of disilane ($Si_2H_6$).

Example 4

Alloy preparation: 150 g of Mg powder and 80 g of $Si_{1-x}Ge_x$ alloy powder (Ge: 29 wt %) were thoroughly mixed, then sintered at 780° C. for 1 hr. The alloy was ground into a powder, mixed with 250 g of $B_2O_3$, and then loaded into the reactor (stainless steel vessel) that was installed in the synthesis system as shown in FIG. 1.

Hydrolysis: As 2500 ml of deionized water was gradually pumped into the reactor, the product gases were released, passed through a dry chamber containing boron oxide ($B_2O_3$), and then stored in the reservoir.

Figure 9:
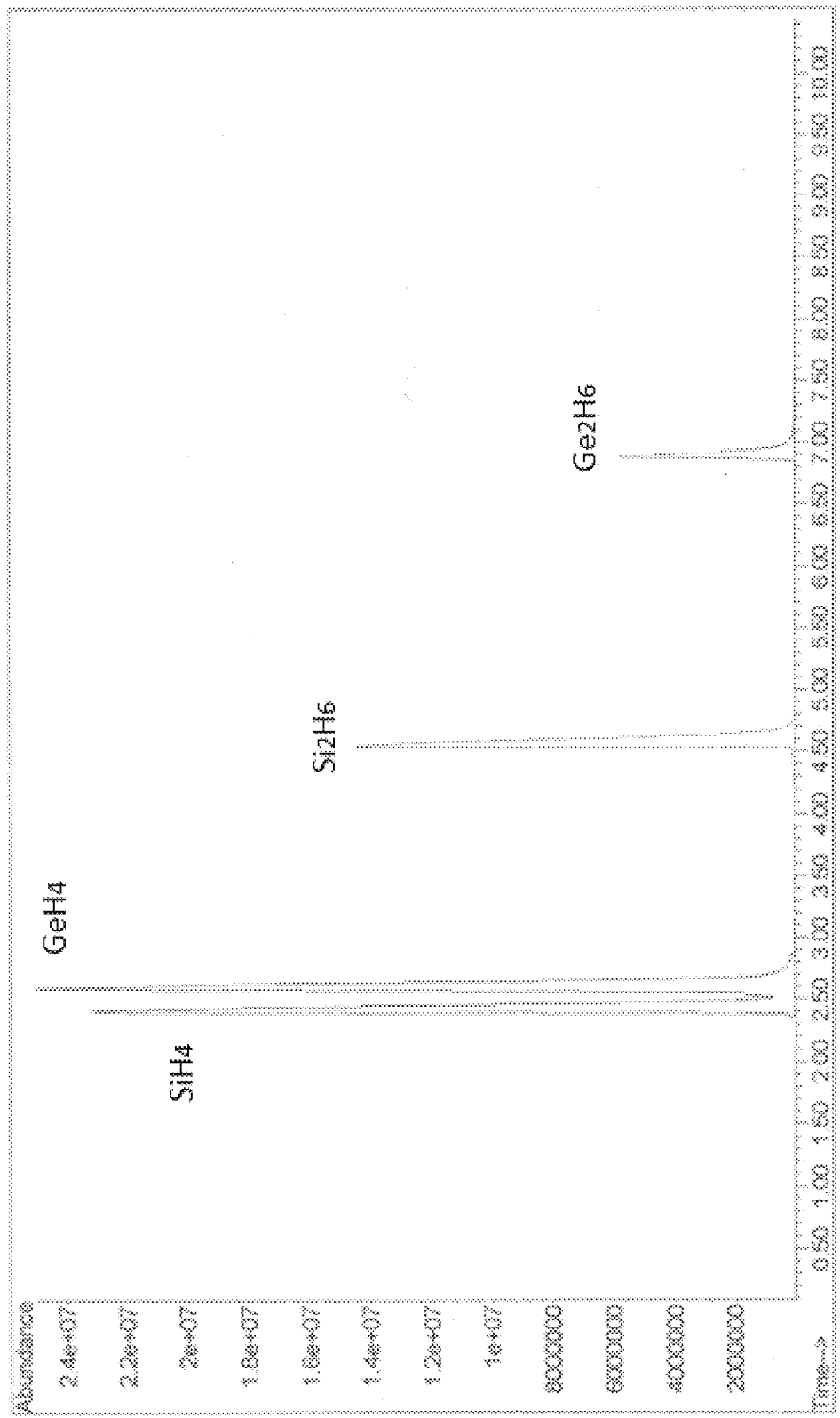
FIG. 9 is a gas chromatogram (GC) from Example 4, indicating the presence of silane ($SiH_4$) (at 2.45 minute), germane ($GeH_4$) (at 2.65 minute), disilane ($Si_2H_6$) (at 4.6 minute) and digermane ($Ge_2H_6$) (at 6.9 minute).

GC/MS analysis: Samples were collected from the reservoir and analyzed in an Agilent Technologies 6890N/5973 GCMS system. The temperature programming of the GC was maintained at 75° C. for the first three minutes, increased 5° C./min to 135° C., and then held at that temperature to the end of the experiment. FIG. 9 shows the results of a gas chromatogram (a plot of relative abundance as a function of retention time in minutes) indicating the presence of silane ($SiH_4$) (2.45 minute), germane ($GeH_4$) (at 2.65 minute), disilane ($Si_2H_6$) (at 4.6 minute) and digermane ($Ge_2H_6$) (at 6.9 minute).

Example 5

Synthesis: 60 g of $Si_{1-x}Ge_x$ alloy powder (Ge: 29.0% by weight) (waste products generated in the plasma deposition of thin films containing germanium) was loaded into the reactor. As shown in FIG. 1, the reactor was installed in a synthesis system. A solution of 600 ml of 1 wt % KOH was added to the alloy powder in the reactor. The reactor was gradually heated. At 100° C. product gases began to be released, which were passed through the condensation chamber and into a gas storage tank. The reaction was completed at 135° C.

Figure 10:
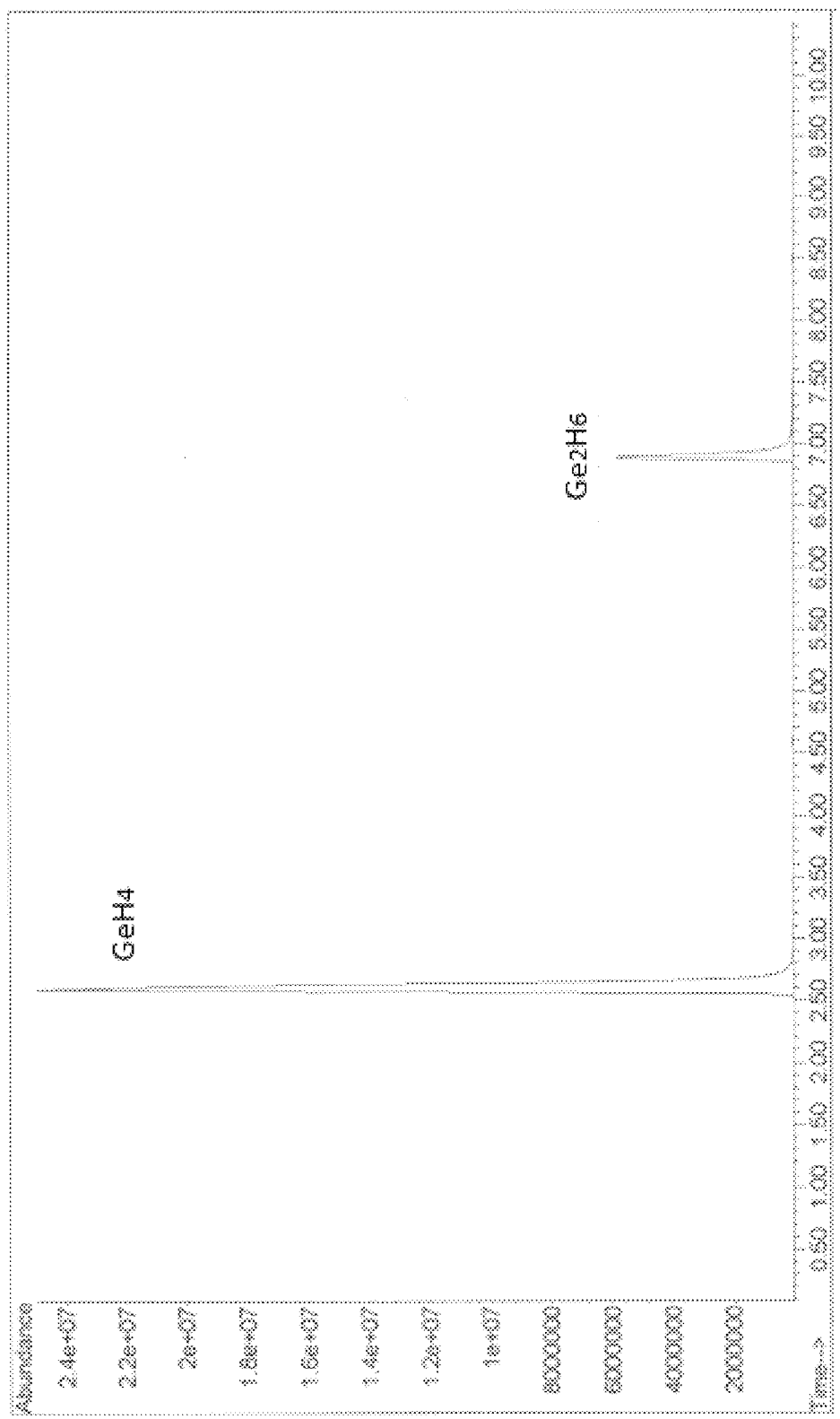
FIG. 10 is a gas chromatogram (GC) from Example 5, indicating the presence of germane ($GeH_4$) (at 2.65 minute) and digermane ($Ge_2H_6$) (at 6.9 minute).

GC/MS analysis: Samples were collected from the reservoir and analyzed in an Agilent Technologies 6890N/5973 GCMS system. The temperature programming of the GC was maintained at 75° C. for the first three minutes, increased 5° C./min until 135° C., and then held at that temperature to the end of the experiment. FIG. 10 shows the results of a gas chromatogram (a plot of relative abundance as a function of retention time in minutes) indicating the presence of germane ($GeH_4$) (at 2.65 minute) and digermane ($Ge_2H_6$) (at 6.9 minute).

Aspect 1 of the disclosure is:
A method of forming a hydride comprising:
  reacting an alloy with water in the presence of an acid to form a product, the product comprising a hydride, the alloy having the formula $A_xB_yGe_zSi_q$, wherein
  A is selected from the group consisting of Mg, Ca, Sr, Ba, Li, Na, K, Rb, Cs, rare earth metals, and combinations of two or more thereof;
  B is selected from the group consisting of Al, Si, Sn, Ga, Zn, Fe, Co, Ni, Cu, Ag, and combinations of two or more thereof;
  $x \geq 0$;
  $y \geq 0$;

x+y>0;

z≥0;

q≥0;

z+q>0.

Aspect 2 of the disclosure is:

The method of Aspect 1, wherein the hydride is a germanium hydride.

Aspect 3 of the disclosure is:

The method of Aspect 2, wherein the germanium hydride comprises germane and digermane.

Aspect 4 of the disclosure is:

The method of Aspect 1, wherein the hydride is a silicon hydride.

Aspect 5 of the disclosure is:

The method of Aspect 4, wherein the silicon hydride comprises silane and disilane.

Aspect 6 of the disclosure is:

The method of Aspect 1, wherein the hydride comprises a germanium hydride and a silicon hydride.

Aspect 7 of the disclosure is:

The method of any of Aspects 1-6, wherein the acid comprises $B_2O_3$, citric acid, an organic acid, $H_2SO_4$, HCl or $H_3PO_4$.

Aspect 8 of the disclosure is:

The method of any of Aspects 1-6, wherein the acid comprises $B_2O_3$ or citric acid.

Aspect 9 of the disclosure is:

The method of any of Aspects 1-8, wherein A is Mg, Ca, Li, Na, or combination of two or more thereof.

Aspect 10 of the disclosure is:

The method of any of Aspects 1-9, wherein B is Al, Zn, or a combination thereof.

Aspect 11 of the disclosure is:

The method of any of Aspects 1-10, wherein x≤10, y≤10, and z+q=1.

Aspect 12 of the disclosure is:

The method of Aspect 11, wherein x≤5 and y≤3.

Aspect 13 of the disclosure is:

The method of Aspect 12, wherein x≥1.

Aspect 14 of the disclosure is:

The method of any of Aspects 1-13, wherein z=0 or q=0.

Aspect 15 of the disclosure is:

The method of any of Aspects 1-14, wherein the alloy, the water, and the acid form a mixture, the mixture having a pH less than 7.0.

Aspect 16 of the disclosure is:

The method of Aspect 15, wherein the pH of the mixture is in the range from 3.0-6.0.

Aspect 17 of the disclosure is:

The method of any of Aspects 1-16, further comprising forming the alloy.

Aspect 18 of the disclosure is:

The method of Aspect 17, wherein the forming the alloy comprises reacting a first starting material with a second starting material, the first starting material comprising A or B, the second starting material comprising Ge or Si.

Aspect 19 of the disclosure is:

The method of Aspect 18, wherein the first starting material comprises A in elemental form or B in elemental form.

Aspect 20 of the disclosure is:

The method of Aspect 18, wherein the first starting material comprises A in elemental form and B in elemental form.

Aspect 21 of the disclosure is:

The method of any of Aspects 18-20, wherein the second starting materials comprises Ge in elemental form or Si in elemental form.

Aspect 22 of the disclosure is:

The method of any of Aspects 18-20, wherein the second starting material comprises an alloy of Si and Ge.

Aspect 23 of the disclosure is:

The method of any of Aspects 18-22, wherein the reacting comprises sintering the first starting material and the second starting material.

Aspect 24 of the disclosure is:

The method of any of Aspects 1-23, further comprising drying the product.

Aspect 25 of the disclosure is:

The method of Aspect 24, wherein the drying comprising exposing the product to an acidic drying agent.

Aspect 26 of the disclosure is:

The method of Aspect 25, wherein the acidic drying agent comprises $B_2O_3$.

Aspect 27 of the disclosure is:

A method of forming a germanium hydride comprising:

reacting a germanium-containing oxide and a borohydride in the presence of an acid.

Aspect 28 of the disclosure is:

The method of Aspect 27, wherein the germanium-containing oxide is $GeO_2$.

Aspect 29 of the disclosure is:

The method of Aspect 27 or 28, wherein the acid is $B_2O_3$ or citric acid.

Aspect 30 of the disclosure is:

The method of any of Aspects 27-29, wherein the borohydride is $NaBH_4$, $KBH_4$ or $LiBH_4$.

Those skilled in the art will appreciate that the methods and designs described have additional applications and that the relevant applications are not limited to the illustrative example described herein. The present disclosure may be embodied in other specific forms without departing from the essential characteristics or principles as described herein. The embodiments described above are to be considered in all respects as illustrative only and not restrictive in any manner upon the scope and practice of the methods disclosed herein. It is the following claims, including all equivalents, which define the true scope of the disclosure.

What is claimed is:

1. A method of forming a hydride comprising:

reacting an alloy with water in the presence of an acid to form a product, the acid comprising $B_2O_3$ or an organic acid, the product comprising a hydride, the alloy having the formula $A_xB_yGe_zSi_q$, wherein A is selected from the group consisting of Mg, Ca, Sr, Ba, Li, Na, K, Rb, Cs, rare earth metals, and combinations of two or more thereof;

B is selected from the group consisting of Al, Si, Sn, Ga, Zn, Fe, Co, Ni, Cu, Ag, and combinations of two or more thereof;

x≥0;

y≥0;

x+y>0;

z≥0;

q≥0.

2. The method of claim 1, wherein the hydride is a germanium hydride.

3. The method of claim 2, wherein the germanium hydride comprises germane and digermane.

4. The method of claim 1, wherein q>0 and the hydride is a silicon hydride.

5. The method of claim 4, wherein the silicon hydride comprises silane and disilane.

6. The method of claim 1, wherein q>0 and the hydride comprises a germanium hydride and a silicon hydride.

7. The method of claim 1, wherein the acid comprises citric acid.

8. The method of claim 1, wherein A is Mg, Ca, Li, Na, or combination of two or more thereof.

9. The method of claim 1, wherein B is Al, Zn, or a combination thereof.

10. The method of claim 1, wherein $x \leq 10$, $y \leq 10$, and $z+q=1$.

11. The method of claim 10, wherein $x \leq 5$ and $y \leq 3$.

12. The method of claim 11, wherein $x \geq 1$.

13. The method of claim 1, wherein $q=0$.

14. The method of claim 1, wherein the alloy, the water, and the acid form a mixture, the mixture having a pH less than 7.0.

15. The method of claim 14, wherein the pH of the mixture is in the range from 3.0-6.0.

16. The method of claim 1, further comprising forming the alloy.

17. The method of claim 16, wherein the forming the alloy comprises reacting a first starting material with a second starting material, the first starting material comprising A or B, the second starting material comprising Ge or, Si and Ge.

18. The method of claim 17, wherein the first starting material comprises A in elemental form or B in elemental form.

19. The method of claim 17, wherein the first starting material comprises A in elemental form and B in elemental form.

20. The method of claim 17, wherein the second starting materials comprises Ge in elemental form or, Si and Ge in elemental forms.

21. The method of claim 17, wherein the second starting material comprises an alloy of Si and Ge.

22. The method of claim 17, wherein the reacting comprises sintering the first starting material and the second starting material.

23. The method of claim 1, further comprising drying the product.

24. The method of claim 23, wherein the drying comprising exposing the product to an acidic drying agent.

25. The method of claim 24, wherein the acidic drying agent comprises $B_2O_3$.

26. A method of forming a germanium hydride comprising:

reacting a germanium-containing oxide and a borohydride in the presence of an organic acid or $B_2O_3$.

27. The method of claim 26, wherein the germanium-containing oxide is $GeO_2$.

28. The method of claim 26, wherein the organic acid is citric acid.

29. The method of claim 26, wherein the borohydride is $NaBH_4$, $KBH_4$ or $LiBH_4$.

* * * * *